(12) United States Patent
Feng (10) Patent No.: US 12,532,046 B2
(45) Date of Patent: Jan. 20, 2026

(54) STREAMING MEDIA PROCESSING METHOD, SYSTEM AND DEVICE

(71) Applicant: BOE Technology Group Co., Ltd., Beijing (CN)

(72) Inventor: Feng Feng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/580,833

(22) PCT Filed: Dec. 15, 2021

(86) PCT No.: PCT/CN2021/138264
§ 371 (c)(1),
(2) Date: Jan. 19, 2024

(87) PCT Pub. No.: WO2023/108468
PCT Pub. Date: Jun. 22, 2023

(65) Prior Publication Data
US 2024/0340490 A1  Oct. 10, 2024

(51) Int. Cl.
*H04N 21/4402* (2011.01)
(52) U.S. Cl.
CPC .............. *H04N 21/4402* (2013.01)
(58) Field of Classification Search
CPC .................................... H04N 21/4402
See application file for complete search history.

(56) References Cited

U.S. PATENT DOCUMENTS

| 9,135,412 | B1* | 9/2015 | Talvensaari | ......... H04L 41/0816 |
| 2008/0162713 | A1* | 7/2008 | Bowra | ............... H04N 21/4344 |
| | | | | 709/231 |
| 2012/0242775 | A1 | 9/2012 | Lin | |
| 2019/0042483 | A1 | 2/2019 | Abramson et al. | |
| 2019/0320210 | A1 | 10/2019 | Ilhan et al. | |

FOREIGN PATENT DOCUMENTS

| CN | 102695036 A | 9/2012 |
| CN | 103259739 A | 8/2013 |
| CN | 109600624 A | 4/2019 |
| CN | 209625764 U | 11/2019 |
| CN | 212012861 U | 11/2020 |

(Continued)

OTHER PUBLICATIONS

International Search Report, mailed Apr. 27, 2022, from PCT International Application No. PCT/CN2021/138264, 4 pages.

(Continued)

*Primary Examiner* — Yassin Alata
(74) *Attorney, Agent, or Firm* — Workman Nydegger (57) ABSTRACT

A media streaming processing method, system and device for performing media streaming processing according to an external OPS device of a display device to reduce the processing burden of the display device without adding an additional server. The method includes: determining a sub-media stream allocated for an open pluggable specification OPS device external to a display device from acquired media streams; and performing media processing on the sub-media stream via the OPS device, and sending an OPS media stream obtained after the media processing to the display device.

19 Claims, 6 Drawing Sheets

(56) References Cited

FOREIGN PATENT DOCUMENTS

| CN | 112399252 A | 2/2021 |
|----|-------------|--------|
| CN | 212515537 U | 2/2021 |
| CN | 113253984 A | 8/2021 |

OTHER PUBLICATIONS

Intel IOTG, "Digital signage/interactive integrated electronic whiteboard", China Open Pluggable Specification (OPS-C), Electrical, mechanical, and heat dissipation specifications, Sep. 2014, 61 pages.
Chinese First Office Action, mailed Aug. 23, 2025, from China Patent Application No. 202180003982.8, 14 pages.

* cited by examiner

STREAMING MEDIA PROCESSING METHOD, SYSTEM AND DEVICE

CROSS-REFERENCE TO RELATED APPLICATIONS

The present application is a National Stage of International Application No. PCT/CN2021/138264, filed Dec. 15, 2021, the entire contents of which are incorporated herein by reference.

TECHNICAL FIELD

The present disclosure relates to the technical field of streaming media, and in particular to a streaming media processing method, system and device.

BACKGROUND

Traditional video stream processing methods are mainly divided into two types. In one type of the method, a video stream is forwarded to a display device for display after being processed by a cloud server. In the other type of the method, a display device displays a video stream after the video steam is processed by the display device itself.

Taking a video conferencing scenario of a display device as an example, the display device needs to display multipath video streams. In the current methods, if the multipath video streams are processed by the display device itself, it will cause much burden to a central processing unit (CPU) of the display device, resulting in stuttering of the video call. If the multipath video streams are processed by a server, the additional server is required, which not only increases the hardware cost, but also has poor portability.

SUMMARY

The present disclosure provides a streaming media processing method, system, and device. Streaming media processing is performed by using an open pluggable specification (OPS) device externally connected to a display device, which will reduce the processing load of the display device without the need for adding an additional server.

In a first aspect, embodiments of the present disclosure provide a streaming media processing method, including:
  determining a sub-media stream(s) allocated for an OPS device external to a display device from acquired media streams; and
  performing media processing on the sub-media stream(s) via the OPS device, and sending OPS media stream(s) obtained after the media processing to the display device.

In the streaming media processing method provided by the embodiments, the streaming media processing is performed by means of the OPS device external to the display device, which can effectively share the processing pressure of the display device, and does not need to add an additional hardware device, to thereby reduce the processing load of the display device without the need for adding an additional server.

As optional embodiments, the determining the sub-media stream(s) allocated for the OPS device external to the display device from the acquired media streams, includes:
  splitting the acquired media streams into a plurality of media units;
  determining a media unit(s) allocated for the OPS device from the plurality of media units; and
  determining the allocated media unit(s) as the sub-media stream(s).

In the embodiments, by splitting the media streams, compared with the way of allocating the media streams as a whole, a fine-grained and smaller way of allocating the media streams is provided. The media units in the embodiments may be multiple media units obtained by dividing media streams of the same service, or may be multiple media units obtained by dividing media streams of different services.

As optional embodiments, the splitting the acquired media streams into the plurality of media units, includes:
  splitting the acquired media streams into the plurality of media units according to a preset size; or,
  splitting the acquired media streams into the plurality of media units according to a service type; or,
  splitting the acquired media streams into the plurality of media units according to a first resource idle rate of the display device; or,
  splitting the acquired media streams into the plurality of media units according to a second resource idle rate of the OPS device.

The embodiments provides multiple ways of splitting media streams, and can provide a splitting way that is more flexible and more adaptable to scenarios according to different requirements.

As optional embodiments, the determining the sub-media stream(s) allocated for the OPS device external to the display device from the acquired media streams, includes:
  determining the sub-media stream(s) allocated for the OPS device from the acquired media streams according to a first resource idle rate of the display device; or,
  determining the sub-media stream(s) allocated for the OPS device from the acquired media streams according to a second resource idle rate of the OPS device.

This embodiment provides different distribution methods on the distribution of media streams. Based on different needs of users, the users can flexibly choose the distribution methods of media streams, providing a more flexible distribution method with higher adaptability to scenarios.

As optional embodiments, the determining the sub-media stream(s) allocated for the OPS device from the acquired media streams according to the first resource idle rate of the display device, includes:
  in response to determining that the first resource idle rate is greater than a first threshold, determining a first media stream corresponding to the first resource idle rate from the acquired media streams, and determining the sub-media stream(s) according to the acquired media streams and the first media stream; or,
  in response to determining that the first resource idle rate is greater than a second resource idle rate, determining a first media stream corresponding to the first resource idle rate from the acquired media streams, and determining the sub-media stream(s) according to the acquired media streams and the first media stream.

As optional embodiments, the determining the sub-media stream(s) allocated for the OPS device from the acquired media streams according to the second resource idle rate of the OPS device, includes:
  in response to determining that the second resource idle rate is greater than a second threshold, determining a second media stream corresponding to the second resource idle rate from the acquired media streams, and determining the second media stream as the sub-media stream(s); or, in response to determining that the second resource idle rate is greater than or equal to a first resource idle rate, determining a second media stream corresponding to the second resource idle rate from the acquired media streams, and determining the second media stream as the sub-media stream(s).

As optional embodiments, the method further includes:
performing, by using the display device, media processing on media stream(s) other than the sub-media stream(s) in the acquired media streams, to obtain display media stream(s).

As optional embodiments, after performing, by using the display device, media processing on media stream(s) other than the sub-media stream(s) in the acquired media streams, to obtain display media stream(s), the method further includes:
merging a part of the OPS media stream(s) and a part of the display media stream(s) belonging to a same service, to obtain a merged media stream, and displaying the merged media stream through the display device.

As optional embodiments, the method further includes:
displaying a configuration interface for the OPS device through the display device; and
in response to an input instruction on the configuration interface from a user, performing a configuration corresponding to the input instruction on a mode of media processing of the OPS device.

The embodiments may further provide a method for configuring the media processing mode of the OPS device via the display device, and perform different media processing according to different needs of users in a more portable manner, which can improve user experience.

As optional embodiments, the displaying the configuration interface for the OPS device through the display device, includes:
displaying the configuration interface for the OPS device through a webpage built in an application of the display device; or,
displaying the configuration interface for the OPS device through a web browser of the display device.

As optional embodiments, the performing the configuration corresponding to the input instruction on the mode of media processing of the OPS device, includes:
performing the configuration corresponding to the input instruction on the mode of media processing of the OPS device through a web server of the OPS device.

As optional embodiments, the media processing includes at least one of decoding, transcoding, or video enhancement.

In a second aspect, embodiments of the present disclosure provide a streaming media processing system including:
a display device and an OPS device external to the display device; wherein
the OPS device is configured to determine a sub-media stream(s) allocated for itself from acquired media streams, perform media processing on the sub-media stream(s), and send OPS media stream(s) obtained after the media processing to the display device; and
the display device is configured to display the OPS media stream(s).

In a third aspect, embodiments of the present disclosure further provide a streaming media processing device, including a processor and a memory, where the memory is configured to store programs executable by the processor, and the processor is configured to read the programs in the memory to execute the following operations:

determining a sub-media stream(s) allocated for an OPS device external to a display device from acquired media streams; and
performing media processing on the sub-media stream(s), and sending OPS media stream(s) obtained after the media processing to the display device.

As optional embodiments, the processor is configured to execute:
splitting the acquired media streams into a plurality of media units;
determining a media unit(s) allocated for the OPS device from the plurality of media units; and
determining the allocated media unit(s) as the sub-media stream(s).

As optional embodiments, the processor is configured to execute:
splitting the acquired media streams into the plurality of media units according to a preset size; or,
splitting the acquired media streams into the plurality of media units according to a service type; or,
splitting the acquired media streams into the plurality of media units according to a first resource idle rate of the display device; or,
splitting the acquired media streams into the plurality of media units according to a second resource idle rate of the OPS device.

an optional embodiments, the processor is configured to execute:
determining the sub-media stream(s) allocated for the OPS device from the acquired media streams according to a first resource idle rate of the display device; or,
determining the sub-media stream(s) allocated for the OPS device from the acquired media streams according to a second resource idle rate of the OPS device.

As optional embodiments, the processor is configured to execute:
in response to determining that the first resource idle rate is greater than a first threshold, determining a first media stream corresponding to the first resource idle rate from the acquired media streams, and determining the sub-media stream(s) according to the acquired media streams and the first media stream; or,
in response to determining that the first resource idle rate is greater than a second resource idle rate, determining a first media stream corresponding to the first resource idle rate from the acquired media streams, and determining the sub-media stream(s) according to the acquired media streams and the first media stream.

As optional embodiment, the processor is configured to execute:
in response to determining that the second resource idle rate is greater than a second threshold, determining a second media stream corresponding to the second resource idle rate from the acquired media streams, and determining the second media stream as the sub-media stream(s); or,
in response to determining that the second resource idle rate is greater than or equal to a first resource idle rate, determining a second media stream corresponding to the second resource idle rate from the acquired media streams, and determining the second media stream as the sub-media stream(s).

As optional embodiments, in the performing media processing on the sub-media stream(s) via the OPS device, the processor is configured to execute:

performing, by using the display device, media processing on media stream(s) other than the sub-media stream(s) in the acquired media streams, to obtain display media stream(s).

As optional embodiments, after performing, by using the display device, media processing on media stream(s) other than the sub-media stream(s) in the acquired media streams, to obtain display media stream(s), the processor is configured to execute:

merging a part of the OPS media stream(s) and a part of the display media stream(s) belonging to a same service, to obtain a merged media stream, and displaying the merged media stream through the display device.

an optional embodiments, the processor is specifically further configured to execute:

displaying a configuration interface for the OPS device through the display device; and in response to an input instruction on the configuration interface from a user, performing a configuration corresponding to the input instruction on a mode of media processing of the OPS device.

As optional embodiments, the processor is configured to execute:

displaying the configuration interface for the OPS device through a webpage built in an application of the display device; or, displaying the configuration interface for the OPS device through a web browser of the display device.

As optional embodiments, the processor is configured to execute:

performing the configuration corresponding to the input instruction on the mode of media processing of the OPS device through a web server of the OPS device.

As optional embodiments, the media processing includes at least one of decoding, transcoding, or video enhancement.

In a fourth aspect, embodiments of the present disclosure further provide a streaming media processing device, including:

a media stream allocation unit, configured to determine a sub-media stream(s) allocated for an OPS device external to a display device from acquired media streams; and a media stream processing unit, configured to perform media processing on the sub-media stream(s) via the OPS device, and send OPS media stream(s) obtained after the media processing to the display device.

As optional embodiments, the media stream allocation unit is configured to:

split the acquired media streams into a plurality of media units;

determine a media unit(s) allocated for the OPS device from the plurality of media unit(s); and determine the allocated media unit(s) as the sub-media stream(s).

As optional embodiments, the media stream allocation unit is configured to:

split the acquired media streams into the plurality of media units according to a preset size; or, split the acquired media streams into the plurality of media units according to a service type; or, split the acquired media streams into the plurality of media units according to a first resource idle rate of the display device; or, split the acquired media streams into the plurality of media units according to a second resource idle rate of the OPS device.

As optional embodiments, the media stream allocation unit is configured to:

determine the sub-media stream(s) allocated for the OPS device from the acquired media streams according to a first resource idle rate of the display device; or, determine the sub-media stream(s) allocated for the OPS device from the acquired media streams according to a second resource idle rate of the OPS device.

As optional embodiments, the media stream allocation unit is configured to:

in response to determining that the first resource idle rate is greater than a first threshold, determine a first media stream corresponding to the first resource idle rate from the acquired media streams, and determine the sub-media stream(s) according to the acquired media streams and the first media stream; or, in response to determining that the first resource idle rate is greater than a second resource idle rate, determine a first media stream corresponding to the first resource idle rate from the acquired media streams, and determine the sub-media stream(s) according to the acquired media streams and the first media stream.

As optional embodiments, the media stream allocation unit is configured to:

in response to determining that the second resource idle rate is greater than a second threshold, determine a second media stream corresponding to the second resource idle rate from the acquired media streams, and determine the second media stream as the sub-media stream(s); or, in response to determining that the second resource idle rate is greater than or equal to a first resource idle rate, determine a second media stream corresponding to the second resource idle rate from the acquired media streams, and determine the second media stream as the sub-media stream(s).

As optional embodiments, the performing media processing on the sub-media stream(s) via the OPS device, the device further includes a processing and displaying unit configured to:

perform, by using the display device, media processing on media stream(s) other than the sub-media stream(s) in the acquired media streams, to obtain display media stream(s).

As optional embodiments, after performing, by using the display device, media processing on media stream(s) other than the sub-media stream(s) in the acquired media streams, to obtain display media stream(s), the device further includes a merging unit configured to:

merge a part of the OPS media stream(s) and a part of the display media stream(s) belonging to a same service, to obtain a merged media stream, and display the merged media stream through the display device.

As optional embodiments, the device further includes a configuration unit configured to:

display a configuration interface for the OPS device through the display device; and in response to an input instruction on the configuration interface from a user, perform a configuration corresponding to the input instruction on a mode of media processing of the OPS device.

As optional embodiments, the configuration unit is configured to:

display the configuration interface for the OPS device through a webpage built in an application of the display device; or, display the configuration interface for the OPS device through a web browser of the display device.

As optional embodiments, the configuration unit is configured to:

perform the configuration corresponding to the input instruction on the mode of media processing of the OPS device through a web server of the OPS device.

As optional embodiments, the media processing includes at least one of decoding, transcoding, or video enhancement.

In a fifth aspect, embodiments of the present disclosure further provide a non-transitory computer storage medium, on which computer programs are stored, where, when the computer programs are executed by a processor, operations of the method described in the first aspect are executed.

These or other aspects of the present disclosure will be more concise and understandable in the description of the following embodiments.

BRIEF DESCRIPTION OF FIGURES

In order to more clearly illustrate the technical solutions in the embodiments of the present disclosure, the drawings that need to be used in the description of the embodiments will be briefly introduced below. Obviously, the drawings in the following description are only some embodiments of the present disclosure. Those skilled in the art can also obtain other drawings based on these drawings without any creative effort.

DETAILED DESCRIPTION

In order to make the purpose, technical solutions and advantages of the present disclosure clearer, the present disclosure will be further described in detail below in conjunction with the accompanying drawings. Apparently, the described embodiments are only part but not all of the embodiments of the present disclosure. Based on the embodiments in the present disclosure, all other embodiments obtained by persons of ordinary skill in the art without making creative efforts belong to the scope of the present disclosure.

The term "and/or" in the embodiments of the present disclosure describes an association relationship among associated objects, indicating that there may be three relationships, for example, A and/or B, which may mean: A exists alone, A and B exist simultaneously, and B exists alone. The character "/" generally indicates that associated objects before and after the character are in an "or" relationship.

The scenarios described in the embodiments of the present disclosure are to illustrate the technical solutions of the embodiments of the present disclosure more clearly, and do not constitute limitations on the technical solutions provided by the embodiments of the present disclosure. Those skilled in the art know that with the emergence of new scenarios, the technical solutions provided by the embodiments of the present disclosure are also applicable to similar technical problems. Here, in the description of the present disclosure, unless otherwise specified, "a plurality of" or "multiple" means two or more elements.

Traditional video stream processing methods are mainly divided into two types. In one type of the method, a video stream is forwarded to a display device for display after being processed by a cloud server. In the other type of the method, a display device displays a video stream after the video stream is processed by the display device itself. Taking a video conferencing scenario of a display device as an example, the display device needs to display multipath video streams. In the current methods, if the multipath video streams are processed by the display device itself, it will cause much burden to a central processing unit (CPU) of the display device, resulting in stuttering of the video call. If the multiple video streams are processed by a server, the additional server is required, which not only increases the hardware cost, but also has poor portability.

Due to poor compatibility of a current display device with various applications APPs and poor processing performance of the display device, the display device is generally equipped with an OPS interface. More extended functions are achieved by an external OPS device connecting to the OPS interface. Since the system in the OPS device are mostly a windows system, which have high compatibility with various APPs, and the processing performance of the OPS device is highly scalable, it is possible to improve the processing capability of the OPS device and extend types of processing services of the OPS device by integrating hardware or software on the OPS device.

In embodiments of the present disclosure, no additional hardware device is required to be added in the existing OPS device. The OPS device processes media stream(s) for the display device, reducing media processing resources of the display device. Especially, when multipath media streams require to be processed concurrently, the OPS device can well undertake the task of media processing, reducing the processing pressure of the CPU of the display device, and avoiding the phenomenon of stuttering when multipath videos are displayed at the same time, which affects the user experience.

The core concept of the embodiments is that the OPS device externally connected to the display device is used to process at least part of media streams, so as to share the media processing pressure of the CPU of the display device, and then sends the processed OPS media stream(s) to the display device, so that the display device performs corresponding processing.

Figure 1:
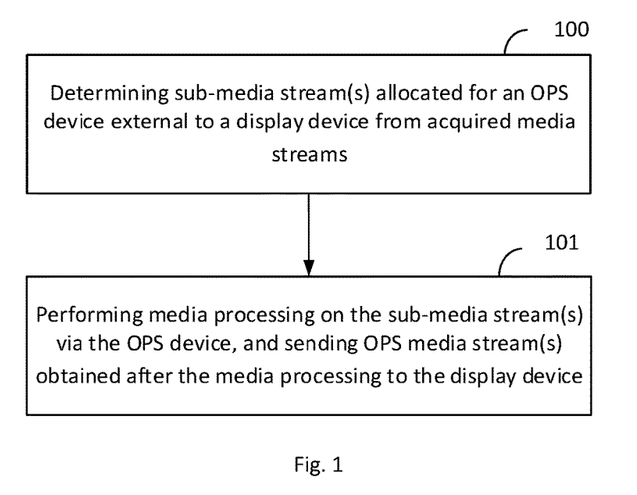
FIG. 1 is an implementation flowchart of streaming media processing according to an embodiment of the present disclosure.

As shown in FIG. 1, an implementation process of streaming media processing according to an embodiment of the present disclosure is as follows.

Step 100, determining sub-media stream(s) allocated for an OPS device external to a display device from acquired media streams.

In implementations, an OPS interface of the display device is used to externally connect the OPS device. Since the display device is usually equipped with the OPS interface, the hardware of the display device does not need to be improved in the embodiments. The media stream(s) is/are processed through the OPS device, which shares the processing pressure of the display device. In some embodiments, there may be one or more OPS devices externally connected to the display device, which is not limited in the embodiments.

In some embodiments, the OPS device may determine the resource occupancy of the display device by accessing the CPU of the display device, such as CPU occupancy, task load, etc. The OPS device may also determine the resource occupancy of the OPS device itself. According to the resource occupancy of the OPS device and the resource occupancy of the display device, a scheduling scheme for media streams is determined, for example, selecting a device with less resource occupation to process the media streams, and finally determining at least part of the media streams, and using the OPS device to process the at least part of the media streams.

In some embodiments, a corresponding software function module(s) may be added in the OPS device to realize allocation of a media stream resource(s). The OPS device may determine a sub-media stream(s) allocated for itself by accessing a CPU of the display device and checking an occupancy of its own CPU, and handover the remaining unallocated sub-media stream(s) to the display device for processing. Optionally, all of the acquired media streams may be allocated to the OPS device for processing; or part of the acquired media streams may be allocated to the OPS device for processing, and the remaining part may be allocated to the display device for processing.

Step 101, performing media processing on the sub-media stream(s) through the OPS device, and sending OPS media stream(s) obtained after the media processing to the display device.

In implementations, after processing part of the media streams by the OPS device, the OPS media stream(s) is/are obtained, and the OPS media stream(s) is/are sent to the display device for corresponding display or processing.

In some embodiments, different types of media streams may be processed through the OPS device of the display device, including but not limited to video streams and other types of media streams. In implementations, if the acquired media streams are multipath video streams, at least one of the multipath video streams can be processed by the OPS device and then sent to the display device for display. For example, in a multi-person video conference, after the multipath videos are processed by the OPS device, the processed multipath videos are sent to the display device for display, which can effectively avoid the phenomenon of stuttering of the video call caused by processing the multipath videos by the display device.

In some embodiments, in order to better utilize the OPS device for media processing of the media streams, the acquired media streams may be split first, and then allocated to the OPS device and display device for corresponding processing.

In some embodiments, first, the acquired media streams are split into multiple media units; second, from the multiple media units, a media unit(s) allocated to the OPS device is determined; finally, the allocated media unit(s) is determined as the sub-media stream(s). It should be noted that the multiple media units in the embodiments include but are not limited to two media units or more than two media units.

In some embodiments, the media stream splitting methods include but are not limited to any one or more of the following.

Splitting Method 1: Splitting According to a Preset Size.

In implementations, the acquired media streams are split into a plurality of media units according to the preset size, a media unit(s) allocated to the OPS device is determined from the plurality of media units, and the allocated media unit(s) is determined as a sub-media stream(s).

For example, the acquired media streams may be split into multiple media units with a fixed size first, and then a media unit(s) to be processed by the OPS device may be determined from the multiple media units after splitting. If there are remaining unallocated media units after allocating to the OPS device, then the remaining unallocated media units are sent to the display device for media processing.

Splitting Method 2: Splitting According to a Service Type.

In implementations, the acquired media streams are split into a plurality of media units according to the service type, a media unit(s) allocated to the OPS device is determined from the plurality of media units, and the allocated media unit(s) is determined as a sub-media stream(s).

For example, the acquired media streams may be split into multiple media units first, and each media unit corresponds to one same service. For example, the media streams are split according to a service type, for example, N media streams are split into N media units, where N is a positive integer, any one media stream represents one service, and N media streams represent N types of services. After splitting N media streams into N types of services, each acquired media unit corresponds to the same type of service, that is, corresponding to the same media stream. For example, any media unit acquired after splitting N sessions corresponds to one of the N sessions. Then, the media unit(s) allocated for the OPS device is determined from the multiple media units after splitting. If there are remaining unallocated media units after allocating to the OPS device, then the remaining unallocated media units are sent to the display device for media processing.

Splitting Method 3: Splitting According to a First Resource Idle Rate.

In implementations, according to the first resource idle rate of the display device, the acquired media streams are split into a plurality of media units, a media unit(s) allocated to the OPS device is determined from the plurality of media units, and the allocated media unit(s) is determined as a sub-media stream(s). Here, the first resource idle rate includes but is not limited to at least one of a CPU idle rate or a task load.

For example, a splitting size of a split media unit is determined according to a size of the first resource idle rate, so that the acquired media streams are split according to the splitting size, a media unit(s) is allocated for the OPS device from the multiple media units acquired after splitting, and the allocated media unit(s) is determined as a sub-media stream(s) of the OPS device.

Splitting Method 4: Splitting According to a Second Resource Idle Rate.

In implementations, according to the second resource idle rate of the OPS device, the acquired media streams are split into a plurality of media units, a media unit(s) allocated to the OPS device is determined from the plurality of media units, and the allocated media unit(s) is determined as a sub-media stream(s). Here, the second resource idle rate includes but is not limited to at least one of a CPU idle rate or a task load.

For example, a splitting size of a split media unit is determined according to a size of the second resource idle rate, so that the acquired media streams are split according to the splitting size, a media unit(s) is allocated for the OPS device from the multiple media units acquired after splitting, and the allocated media unit(s) is determined as a sub-media stream(s) of the OPS device.

The embodiments provide multiple ways of splitting media streams, which can adapt to more application scenarios, making the content of media streams that can be processed by the OPS device more abundant, and can split media streams of different sizes according to different conditions. The above-mentioned splitting methods provided by the embodiments can be implemented independently or in combination. For example, splitting method 1 and splitting method 3 are combined and implemented. For a pre-defined service with splitting method 1, media streams corresponding to the service are split according to splitting method 1. Similarly, for a pre-defined service with splitting method 3, media streams corresponding to the service are split according to splitting method 3.

In some embodiments, in order to more dynamically allocate video streams according to the task load and resource occupation of the current display device and OPS device, the embodiments provide any one or multiple ways of allocating media streams as follows.

Allocation Method 1: An Allocation Principle that Makes a Display Device a Priority.

In implementations, the sub-media stream(s) allocated for the OPS device is/are determined from the acquired media streams according to the first resource idle rate of the display device.

In this method, the display device has a higher priority in processing the media stream than the OPS device. In implementations, the media stream(s) allocated to the OPS device is determined based on the first resource idle rate of the display device.

In some embodiments, the media streams are allocated in the following manners.

In an allocation manner 1a, the priority allocation to the display device is determined by comparing with a threshold.

In implementations, if it is determined that the first resource idle rate is greater than a first threshold, then a first media stream corresponding to the first resource idle rate is determined from the acquired media streams, and the sub-media stream(s) is/are determined according to the acquired media streams and the first media stream.

In the case of this allocation manner, the first resource idle rate of the display device is compared with the preset first threshold. If the first resource idle rate is greater than the first threshold, it means that the display device is capable of processing the media stream now. The first media stream corresponding to the first resource idle rate is determined from the acquired media streams, that is, the first media stream matching the current processing capability of the display device is allocated to the display device from the media streams. Finally, the remaining media stream(s), except the first media stream, among the media streams, are allocated to the OPS device for media processing. That is, the media stream(s) obtained by subtracting the first media stream from the media streams are determined as the sub-media stream(s) processed by the OPS device.

In an allocation manner 1b, the priority allocation to the display device is determined by comparing the display device with the OPS device.

In the case of this allocation manner, if it is determined that the first resource idle rate is greater than a second resource idle rate, then a first media stream corresponding to the first resource idle rate is determined from the acquired media streams, and the sub-media stream(s) is/are determined according to the acquired media streams and the first media stream.

In this case, the resource occupancy of the display device is dynamically compared with the resource occupancy of the OPS device. When it is determined that the first resource idle rate is greater than the second resource idle rate, it means that the display device is more capable of processing media streams than the OPS device. The first media stream corresponding to the first resource idle rate is determined from the acquired media streams, that is, the first media stream matching the current processing capability of the display device is allocated to the display device from the media streams. Finally, the remaining media stream(s), except the first media stream, among the media streams, is/are allocated to the OPS device for media processing. That is, the media stream(s) obtained by subtracting the first media stream from the media streams are determined as at least part of media streams processed by the OPS device.

Allocation Method 2: An Allocation Principle that Makes an OPS Device a Priority.

In implementations, the sub-media stream(s) allocated for the OPS device is/are determined from the acquired media streams according to a second resource idle rate of the OPS device.

In this method, the OPS device has a higher priority in processing the media stream than the display device. In implementations, the media stream(s) allocated to the OPS device is/are determined based on the second resource idle rate of the OPS device.

In some embodiments, the media streams are allocated in the following manners.

In an allocation manner 2a, the priority allocation to the OPS device is determined by comparing with a threshold.

In implementations, if it is determined that the second resource idle rate is greater than a second threshold, then a second media stream corresponding to the second resource idle rate is determined from the acquired media streams, and the second media stream is determined as the sub-media stream(s).

In the case of this allocation manner, the second resource idle rate of the OPS device is compared with the preset second threshold. If the second resource idle rate is greater than the second threshold, it means that the OPS device is capable of processing media streams at this time. The second media stream corresponding to the second resource idle rate is determined from the acquired media streams, that is, the media stream(s) matching the current processing capability of the OPS device is allocated to the OPS device from the media streams. Finally, the remaining media stream(s), except the second media stream, among the media streams, are allocated to the display device for media processing. That is, the media stream(s) obtained by subtracting the second media stream from the media streams are determined as the media stream(s) processed by the display device.

In an allocation manner 2b, the priority allocation to the OPS device is determined by comparing the display device with the OPS device.

In implementations, if it is determined that the second resource idle rate is greater than or equal to a first resource idle rate, then a second media stream corresponding to the second resource idle rate is determined from the acquired media streams, and the second media stream is determined as the sub-media stream(s).

In the case of this allocation manner, the resource occupancy of the display device is dynamically compared with the resource occupancy of the OPS device. When it is determined that the second resource idle rate is greater than or equal to the first resource idle rate, it indicates that the OPS device has the ability to process the media stream at this time. The second media stream corresponding to the second resource idle rate is determined from the acquired media streams, that is, the second media stream that matches the current processing capability of the OPS device is allocated to the OPS device from the media streams. Finally, the remaining media stream(s), except the second media stream, among the media streams, is/are allocated to the display device for media processing.

In some embodiments, after the media stream(s) is/are allocated to the OPS device, if there are remaining media stream(s), the display device is used to perform media processing on media stream(s) except the sub-media stream(s) in the acquired media streams, to obtain a display media stream(s).

In some embodiments, if the media stream of the same service are split into two parts, one part is allocated to the OPS device for media processing, and the other part is allocated to the display device for media processing, then the part of OPS media stream and display media stream belonging to the same service are merged to obtain a merged media stream, and the merged media stream is displayed by the display device.

In implementations, for example, the acquired media streams include multipath video streams (for example, in the case of a multi-person video conference), where one video stream is split into two video units, one video unit is allocated to the OPS device for media processing, and the other video unit is allocated to the display device for media processing. After the media processing is completed, the OPS media stream(s) obtained after processing by the OPS device and the display media stream(s) obtained after processing by the display device are merged to obtain a merged media stream(s), that is, obtaining a to-be-displayed video stream after the one video stream is processed, and the merged media stream(s) is displayed by the display device.

In some embodiments, in order to facilitate the user to realize the function configuration for the OPS device through the display interface of the display device, the following configuration steps are provided.

Figure 2:
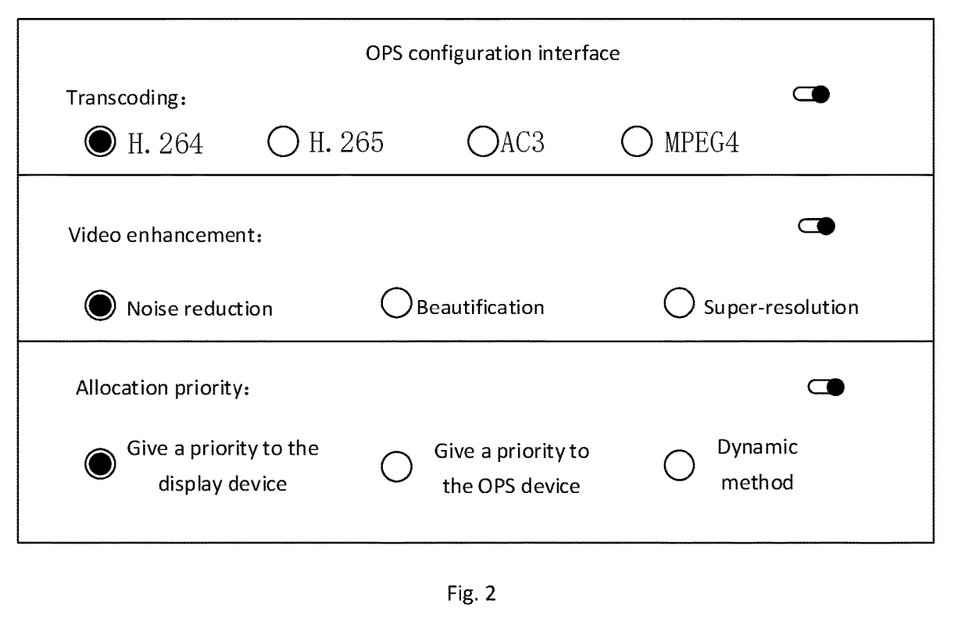
FIG. 2 is a schematic diagram of a configuration interface according to an embodiment of the present disclosure.

1) A configuration interface for the OPS device is displayed by the display device. As shown in FIG. 2, a schematic diagram of the configuration interface is provided in the embodiments. The user can select corresponding configuration items for media processing through configuration items on the configuration interface.

In some embodiments, display methods include but are not limited to any one or more of the following:

1a) displaying the configuration interface for the OPS device through a webpage built in an application of the display device.

1b) displaying the configuration interface for the OPS device through a web browser of the display device;

1c) displaying a part of the configuration interface for the OPS device through a webpage built in an application of the display device, and displaying another part of the configuration interface for the OPS device through a web browser of the display device.

The user can open a built-in webpage Webview in an APP of the display device or directly open a web browser of the display device through a touch screen of the display device. The configuration interface for the OPS device is loaded through a uniform resource locator (URL), which communicates with the OPS device through an HTTP protocol. An input instruction from the user on the configuration interface of the display device is received, and the OPS device is set.

2) In response to an input instruction on the configuration interface from a user, a configuration corresponding to the input instruction is performed on a mode of media processing of the OPS device.

In implementations, the configuration corresponding to the input instruction is performed on the mode of media processing of the OPS device through a web server of the OPS device.

In implementations, the web server can be integrated in the OPS device. The web browser can be run on the display device. The web server in the OPS device can be accessed through the web browser, and then the configuration is performed on the OPS device via a configuration item(s), input from the user, in the configuration interface displayed through the web browser.

Figure 3:
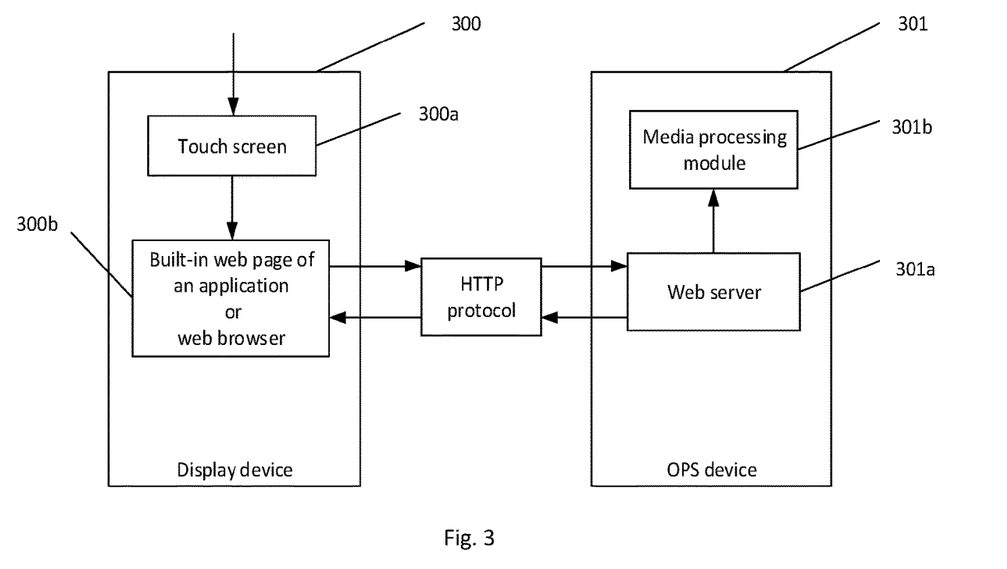
FIG. 3 is a schematic diagram of a connection mode of media configurations of a display device and an OPS device according to an embodiment of the present disclosure.

As shown in FIG. 3, the embodiments provide a connection mode for the media configurations of a display device and an OPS device. The display device 300 includes a touch screen 300*a* and a built-in web page of an application or web browser 300*b*. The OPS device 301 includes a web server 301*a* and a media processing module 301*b*. The user inputs a configuration item through a configuration interface displayed on the built-in web page of the application or web browser 300*b* on the touch screen, and the input configuration item is sent to the web server 301*a* of the OPS device through the HTTP protocol. The web server controls the media processing module 301*b* to perform corresponding media processing.

In some embodiments, the media processing includes but is not limited to at least one of decoding, transcoding, or video enhancement.

During implementations, the user configures the media processing method of the OPS device through the configuration interface. The main contents of the configuration include but are not limited to a transcoding method, video enhancement method and allocation priority.

Configuration Item 1: Transcoding.

During implementations, the user can set whether the OPS device needs to perform transcoding, or which type of code needs to be transcoded into. For example, a player embedded in a web media only supports a decoding format of H.264, so the media stream needs to be transcoded to H.264 before normal playback.

Configuration Item 2: Video Enhancement.

During implementations, by integrating artificial intelligence (AI) processing modules of some software or hardware on the OPS device, the video stream can be subjected to noise reduction, beautification, super-resolution and other processing. The video enhancement module in the embodiments can be implemented by software, and can also be implemented in combination with dedicated chip hardware. If it is implemented in software, the CPU of the OPS device is used to run the AI algorithm. If it is combined with a dedicated chip such as a graphics processing unit (GPU), neural-network processing unit (NPU), digital signal process (DSP), then GPU, NPU, DSP and other resources may be used for media processing, which reduces the pressure of the CPU of the OPS device. The noise reduction algorithm, beautification algorithm, and super-resolution algorithm in the embodiments are just examples. Other AI algorithm modules may be integrated according to service requirements, which are not limited herein.

Configuration Item 3: Allocation Priority.

The embodiments mainly provide three methods: the first one is to give a priority to the display device, that is, when a CPU occupancy rate of the display device and a CPU occupancy rate of the OPS device are both lower than a corresponding threshold, the display device is given a priority for media processing; the second one is to give a priority to the OPS device, that is, when a CPU occupancy rate of the display device and a CPU occupancy rate of the OPS device are both lower than a corresponding threshold, the OPS device is given a priority for media processing; and the third one is a dynamic method, that is, a CPU occupancy rate of the display device and a CPU occupancy rate of the OPS device are obtained in real time, and a priority is given to a device with a lower CPU occupancy rate for media processing.

When scheduling media streams, the acquired media streams are split first to obtain a plurality of media stream units. The media streams are split into a plurality of sessions according to services. Generally, one session represents one media stream. When scheduling is performed, a session is taken as the smallest scheduling unit. After media processing for all the media stream units included in each session is completed, the session is uniformly scheduled, for example, transmitted to the display device for display.

Figure 4:
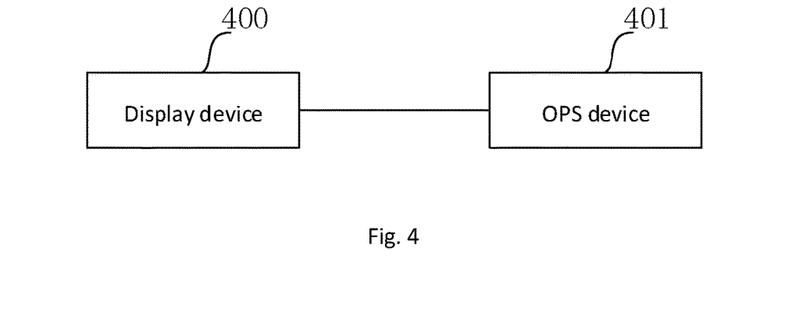
FIG. 4 is a schematic diagram of a streaming media processing system according to an embodiment of the present disclosure.

In some embodiments, a streaming media processing system is further provided in the present disclosure. As shown in FIG. 4, including a display device 400 and an OPS device 401.

In the embodiments, the OPS device 401 is configured to perform functions such as allocation, scheduling, and media processing. During implementations, the OPS device 401 determines sub-media stream(s) allocated for itself from acquired media streams, performs media processing on the sub-media stream(s), and sends the OPS media stream(s) obtained after the media processing to the display device. The OPS device 401 may further determine the media stream(s) allocated for the display device, so that the determined media stream(s) are allocated to the display device for processing to obtain a display media stream(s).

The display device 400 is configured to display the OPS media stream(s). The display device 400 is further configured to receive the media stream(s) allocated by the OPS device and perform media processing to obtain the display media stream(s) for display.

Figure 5:
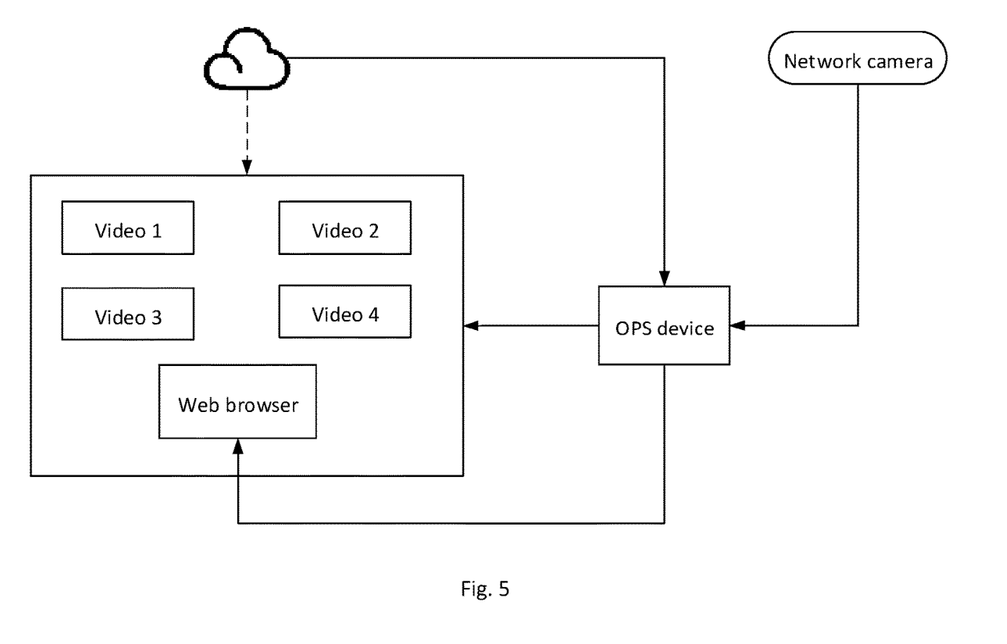
FIG. 5 is a schematic diagram of a display device processing media streams through an OPS device according to an embodiment of the present disclosure.

The manner of acquiring media streams in the embodiments includes but is not limited to: acquiring the media streams through a cloud server, or through a local network camera of the display device, which are not limited in the embodiments herein. As shown in FIG. 5, a schematic diagram of a display device processing a media stream through an OPS device is provided. It can be seen from FIG. 5 that all the media streams acquired through the cloud server or local network camera are first transmitted to the OPS device. The OPS device first splits the acquired media streams into multiple media units, and then determines the media unit(s) allocated to the OPS device itself and the media unit(s) allocated to the display device. After media processing is performed on the media unit(s) allocated to the OPS device itself, the processed media unit(s) is transmitted to the display device for display. If there are multipath video streams, the display device is capable of displaying multipath processed videos simultaneously. In addition, the display device can also configure the OPS device through the web browser or the built-in web page of the APP, and transmit the configuration to the web server of the OPS device through a hyper text transfer protocol (HTTP) protocol, to cause the OPS device to perform a corresponding configuration on a media processing method of the OPS device.

In the embodiments, the acquired media streams are first processed by the OPS device and then transmitted to the display device for display. The OPS device can first split the media streams and then allocated the media streams. In some embodiments, the splitting of the OPS device may be based on a preset size, or based on a first resource idle rate of the display device, or based on a second resource idle rate of the OPS device, which is not limited in the embodiments herein.

In some embodiments, based on at least one of the first resource idle rate of the display device and the second resource idle rate of the OPS device, the sub-media stream(s) allocated to the OPS device and the media stream(s) allocated to the display device may be determined from the acquired media streams.

Figure 6:
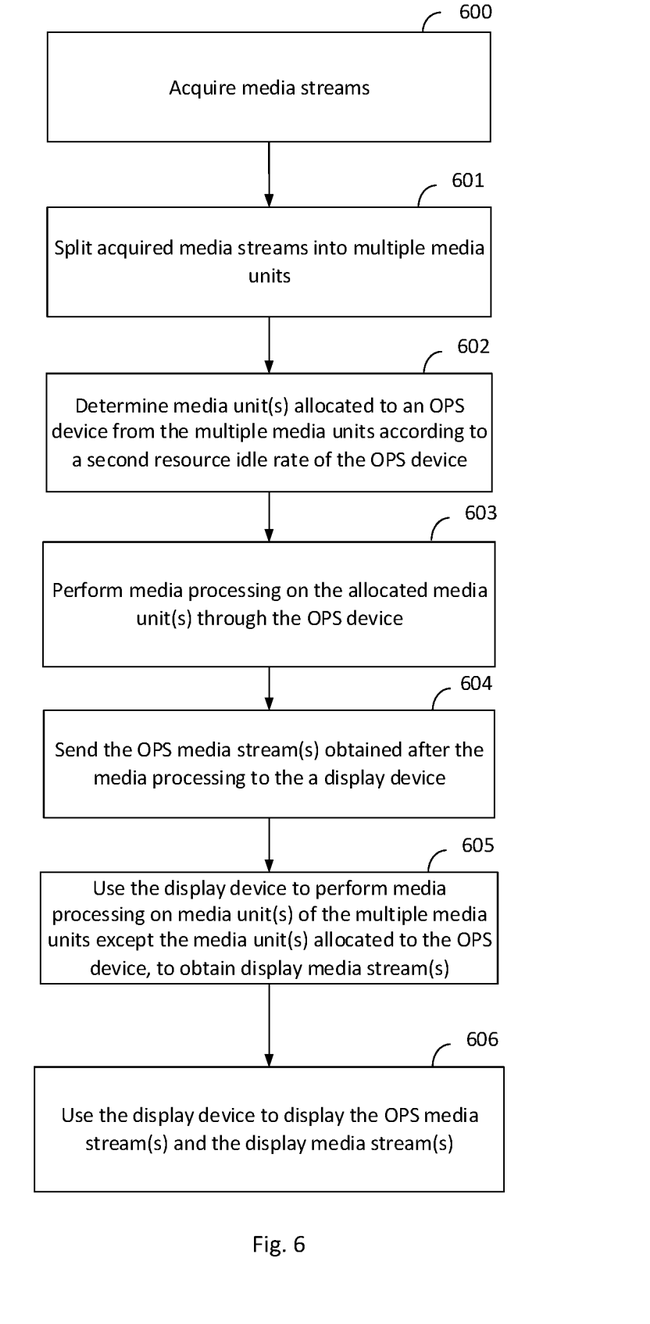
FIG. 6 is an implementation flowchart of scheduling, allocating and processing media streams according to an embodiment of the present disclosure.

In some embodiments, as shown in FIG. 6, an implementation process for scheduling, allocating and processing media streams is provided in the present disclosure, as follows.

Step 600, acquire media streams.

Step 601, split the acquired media streams into multiple media units.

Step 602, determine a media unit(s) allocated to an OPS device from the multiple media units according to a second resource idle rate of the OPS device.

Step 603, perform media processing on the allocated media unit(s) by the OPS device.

Step 604, send the OPS media stream(s) obtained after the media processing to a display device.

Step 605, use the display device to perform media processing on a media unit(s) of the multiple media units except the media unit(s) allocated to the OPS device, to obtain a display media stream(s).

Step 606, use the display device to display the OPS media stream(s) and the display media stream(s).

Figure 7:
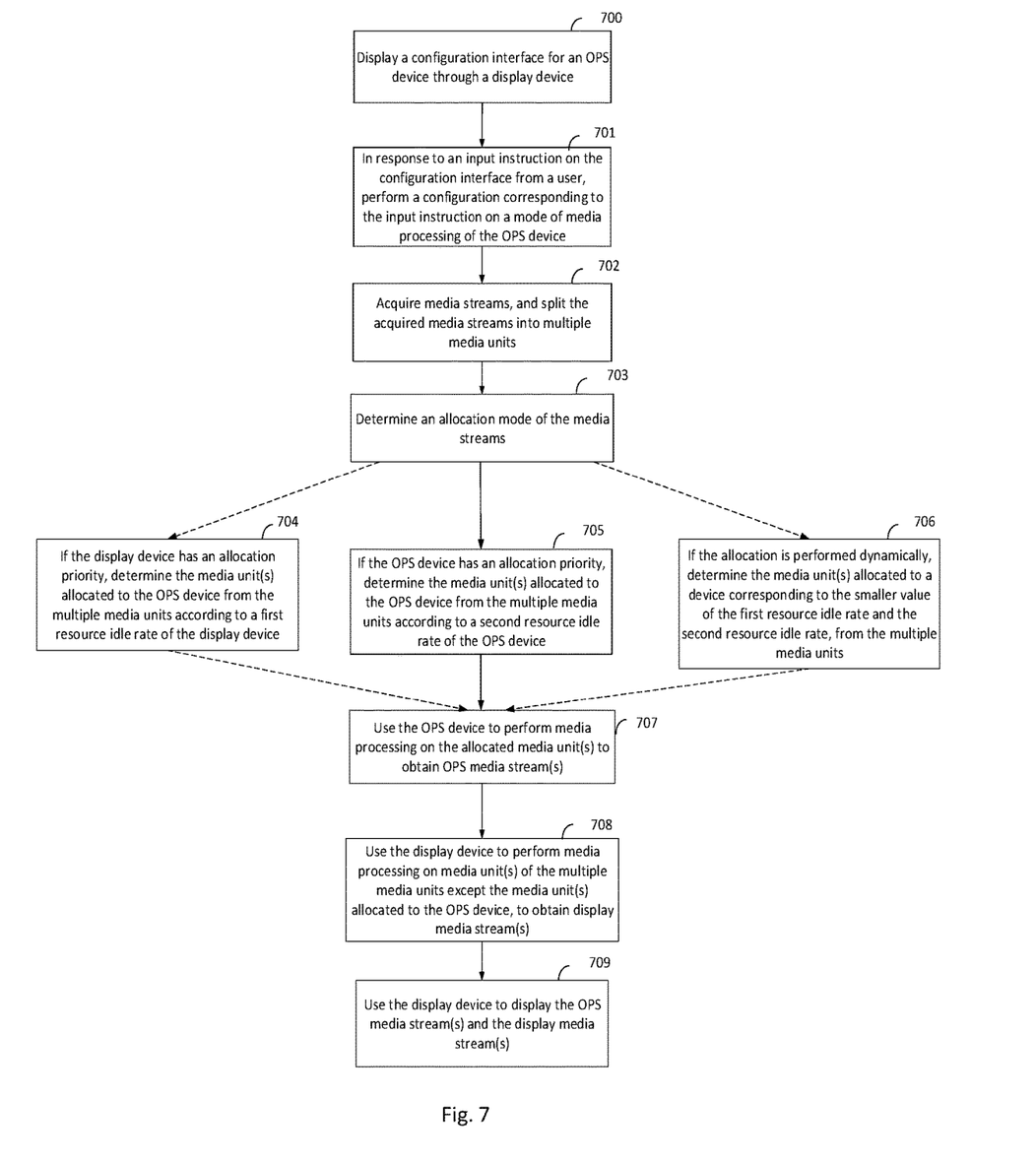
FIG. 7 is an implementation flowchart of configuring OPS and performing media resource allocation according to an embodiment of the present disclosure.

In some embodiments, as shown in FIG. 7, an implementation process for configuring OPS and performing media resource allocation is provided in the present disclosure, as follows.

Step 700, display a configuration interface for an OPS device through a display device.

Step 701, in response to an input instruction on the configuration interface from a user, perform a configuration corresponding to the input instruction on a mode of media processing of the OPS device.

Step 702, acquire media streams, and split the acquired media streams into multiple media units.

Step 703, determine an allocation mode of the media streams.

Step 704, if the display device has an allocation priority, determine the media unit(s) allocated to the OPS device from the multiple media units according to a first resource idle rate of the display device.

Step 705, if the OPS device has an allocation priority, determine the media unit(s) allocated to the OPS device from the multiple media units according to a second resource idle rate of the OPS device.

Step 706, if the allocation is performed dynamically, determine the media unit(s) allocated to a device corresponding to the smaller value of the first resource idle rate and the second resource idle rate, from the multiple media units.

Here, steps 704 to 706 are not in sequence.

Step 707, use the OPS device to perform media processing on the allocated media unit(s) to obtain an OPS media stream(s).

Step 708, use the display device to perform media processing on a media unit(s) of the multiple media units except the media unit(s) allocated to the OPS device, to obtain a display media stream(s).

Step 709, use the display device to display the OPS media stream(s) and the display media stream(s).

Based on the same disclosed concept, the embodiments of the present disclosure further provide a streaming media processing device. Since the device is the device in the method in the embodiments of the present disclosure, and the principle of solving the problem of the device is similar to the method, the implementations of the device refer to the implementations of the method, which will not be repeated herein. It should be noted that the streaming media processing device in the embodiments may be an OPS device, and the streaming media processing method in the embodiments is applied to the OPS device.

Figure 8:
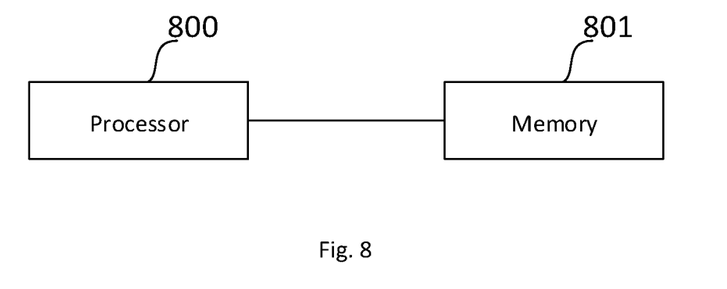
FIG. 8 is a schematic diagram of a streaming media processing device according to an embodiment of the present disclosure.

As shown in FIG. 8, the device includes a processor 800 and a memory 801. The memory 801 is configured to store programs executable by the processor 800. The processor 800 is configured to read the programs in the memory 801 to execute the following operations:

determining sub-media stream(s) allocated for an OPS device external to a display device from acquired media streams; and performing media processing on the sub-media stream(s), and sending OPS media stream(s) obtained after the media processing to the display device.

As optional embodiments, the processor 800 is configured to perform:

splitting the acquired media streams into a plurality of media units;

determining media units allocated for the OPS device from the plurality of media units; and determining the allocated media units as the sub-media stream(s).

As optional embodiments, the processor 800 is configured to perform:

splitting the acquired media streams into the plurality of media units according to a preset size; or, splitting the acquired media streams into the plurality of media units according to a service type; or, splitting the acquired media streams into the plurality of media units according to a first resource idle rate of the display device; or, splitting the acquired media streams into the plurality of media units according to a second resource idle rate of the OPS device.

As optional embodiments, the processor 800 is configured to perform:

determining the sub-media stream(s) allocated for the OPS device from the acquired media streams according to a first resource idle rate of the display device; or, determining the sub-media stream(s) allocated for the OPS device from the acquired media streams according to a second resource idle rate of the OPS device.

As optional embodiments, the processor 800 is configured to perform:

in response to determining that the first resource idle rate is greater than a first threshold, determining a first media stream(s) corresponding to the first resource idle rate from the acquired media streams, and determining the sub-media stream(s) according to the acquired media streams and the first media stream(s); or, in response to determining that the first resource idle rate is greater than a second resource idle rate, determining a first media stream(s) corresponding to the first resource idle rate from the acquired media streams, and determining the sub-media stream(s) according to the acquired media streams and the first media stream(s).

As optional embodiments, the processor 800 is configured to perform:

in response to determining that the second resource idle rate is greater than a second threshold, determining a second media stream(s) corresponding to the second resource idle rate from the acquired media streams, and determining the second media stream(s) as the sub-media stream(s); or, in response to determining that the second resource idle rate is greater than or equal to a first resource idle rate, determining a second media stream(s) corresponding to the second resource idle rate from the acquired media streams, and determining the second media stream(s) as the sub-media stream(s).

As optional embodiments, in the performing media processing on the sub-media stream(s) via the OPS device, the processor 800 is configured to perform:

performing, by using the display device, media processing on media stream(s) other than the sub-media stream(s) in the acquired media streams, to obtain display media stream(s).

As optional embodiments, after performing, by using the display device, media processing on media stream(s) other than the sub-media stream(s) in the acquired media streams, to obtain display media stream(s), the processor 800 is configured to perform:

merging a part of the OPS media stream(s) and the display media stream(s) belonging to a same service, to obtain a merged media stream(s), and displaying the merged media stream(s) through the display device.

As optional embodiments, the processor 800 is configured to perform:

displaying a configuration interface for the OPS device through the display device; and in response to an input instruction on the configuration interface from a user, performing a configuration corresponding to the input instruction on a mode of media processing of the OPS device.

As optional embodiments, the processor 800 is configured to perform:

displaying the configuration interface for the OPS device through a webpage built in an application of the display device; or, displaying the configuration interface for the OPS device through a web browser of the display device.

As optional embodiments, the processor 800 is configured to perform:

performing the configuration corresponding to the input instruction on the mode of media processing of the OPS device through a web server of the OPS device.

As optional embodiments, the media processing includes at least one of decoding, transcoding, or video enhancement.

Based on the same disclosed concept, the embodiments of the present disclosure further provide a streaming media processing device. Since the device is the device in the method in the embodiments of the present disclosure, and the principle of solving the problem of the device is similar to the method, the implementations of the device refer to the implementations of the method, which will not be repeated herein.

Figure 9:
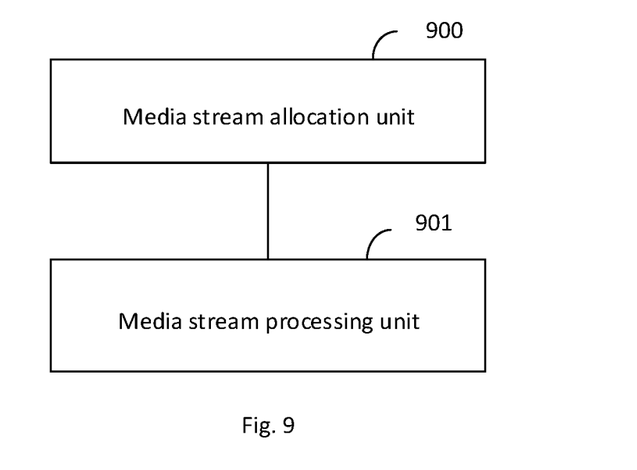
FIG. 9 is a schematic diagram of a streaming media processing device according to an embodiment of the present disclosure.

As shown in FIG. 9, the device includes:

a media stream allocation unit 900, configured to determine sub-media stream(s) allocated for an OPS device external to a display device from acquired media streams; and a media stream processing unit 901, configured to perform media processing on the sub-media stream(s) via the OPS device, and send OPS media stream(s) obtained after the media processing to the display device.

As optional embodiments, the media stream allocation unit 900 is configured to:

split the acquired media streams into a plurality of media units;

determine media unit(s) allocated for the OPS device from the plurality of media units; and determine the allocated media unit(s) as the sub-media stream(s).

As optional embodiments, the media stream allocation unit 900 is configured to:

split the acquired media streams into the plurality of media units according to a preset size; or, split the acquired media streams into the plurality of media units according to a service type; or, split the acquired media streams into the plurality of media units according to a first resource idle rate of the display device; or, split the acquired media streams into the plurality of media units according to a second resource idle rate of the OPS device.

As optional embodiments, the media stream allocation unit 900 is configured to:

determine the sub-media stream(s) allocated for the OPS device from the acquired media streams according to a first resource idle rate of the display device; or, determine the sub-media stream(s) allocated for the OPS device from the acquired media streams according to a second resource idle rate of the OPS device.

As optional embodiments, the media stream allocation unit 900 is configured to:

in response to determining that the first resource idle rate is greater than a first threshold, determine a first media stream(s) corresponding to the first resource idle rate from the acquired media streams, and determine the sub-media stream(s) according to the acquired media streams and the first media stream(s); or, in response to determining that the first resource idle rate is greater than a second resource idle rate, determine a first media stream(s) corresponding to the first resource idle rate from the acquired media streams, and determine the sub-media stream(s) according to the acquired media streams and the first media stream(s).

As optional embodiments, the media stream allocation unit 900 is configured to:

in response to determining that the second resource idle rate is greater than a second threshold, determine a second media stream(s) corresponding to the second resource idle rate from the acquired media streams, and determine the second media stream(s) as the sub-media stream(s); or, in response to determining that the second resource idle rate is greater than or equal to a first resource idle rate, determine a second media stream(s) corresponding to the second resource idle rate from the acquired media streams, and determine the second media stream(s) as the sub-media stream(s).

As optional embodiments, as for the performing media processing on the sub-media stream(s) via the OPS device, the device further includes a processing and displaying unit configured to:

perform, by using the display device, media processing on media stream(s) other than the sub-media stream(s) in the acquired media streams, to obtain display media stream(s).

As optional embodiments, after performing, by using the display device, media processing on media stream(s) other than the sub-media stream(s) in the acquired media streams, to obtain display media stream(s), the device further includes a merging unit configured to:

merge a part of the OPS media stream(s) and the display media stream(s) belonging to a same service, to obtain a merged media stream(s), and display the merged media stream(s) through the display device.

As optional embodiments, the device further includes a configuration unit configured to:

display a configuration interface for the OPS device through the display device; and in response to an input instruction on the configuration interface from a user, perform a configuration corresponding to the input instruction on a mode of media processing of the OPS device.

As optional embodiments, the configuration unit is configured to:

display the configuration interface for the OPS device through a webpage built in an application of the display device; or, display the configuration interface for the OPS device through a web browser of the display device.

As optional embodiments, the configuration unit is configured to:

perform the configuration corresponding to the input instruction on the mode of media processing of the OPS device through a web server of the OPS device.

As optional embodiments, the media processing includes at least one of decoding, transcoding, or video enhancement.

Based on the same disclosed concept, the embodiments of the present disclosure further provide a non-transitory computer storage medium on which computer programs are stored, and when the programs are executed by a processor, the following operations are implemented:

determining sub-media stream(s) allocated for an OPS device external to a display device from acquired media streams; and performing media processing on the sub-media stream(s) via the OPS device, and sending OPS media stream(s) obtained after the media processing to the display device.

Those skilled in the art should understand that the embodiments of the present disclosure may be provided as methods, systems, or computer program products. Accordingly, the present disclosure can take the form of an entire hardware embodiment, an entire software embodiment, or an embodiment combining software and hardware. Furthermore, the present disclosure may take the form of a computer program product embodied on one or more computer-usable storage media (including but not limited to disk storage, CD-ROM, optical storage, etc.) having computer-usable program codes embodied therein.

The present disclosure is described with reference to flowchart illustrations and/or block diagrams of methods, apparatuses (systems), and computer program products according to the embodiments of the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, special purpose computer, embedded processor, or processor of other programmable data processing device to produce a machine, such that the instructions executed by the processor of the computer or other programmable data processing device produce an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including an instruction device, and the instruction device realizes the functions specified in one or more procedures of the flowchart and/or one or more blocks of the block diagram.

These computer program instructions can also be loaded onto a computer or other programmable data processing device, causing a series of operations to be performed on the computer or other programmable device to produce a computer-implemented process, so that the instructions executed on the computer or other programmable device provide steps for implementing the functions specified in one or more flow charts and/or one or more blocks of the block diagrams.

Although preferred embodiments of the present disclosure have been described, those skilled in the art may make additional changes and modifications to these embodiments once they have knowledge of the basic creative concepts. Therefore, the attached claims are intended to be interpreted as including preferred embodiments and all changes and modifications falling within the scope of the present disclosure.

Apparently, those skilled in the art can make various changes and modifications to the embodiments of the present disclosure without departing from the spirit and scope of the embodiments of the present disclosure. Thus, if the modifications and variations of the embodiments of the present disclosure fall within the scope of the claims of the present disclosure and equivalent technologies, the present disclosure also intends to include these modifications and variations.

What is claimed is:

1. A media streaming processing method, comprising:
   determining, by a display device, a sub-media stream allocated for an open pluggable specification, OPS, device external to the display device from acquired media streams; and
   performing media processing on the sub-media stream via the OPS device to obtain an OPS media stream, and sending the OPS media stream to the display device;
   wherein determining, by the display device, a sub-media stream allocated for an open pluggable specification, OPS, device external to the display device from acquired media streams, comprises:
   splitting the acquired media streams into a plurality of media units;
   determining a media unit allocated for the OPS device from the plurality of media units; and
   determining the allocated media unit as the sub-media stream.

2. The method according to claim 1, wherein said splitting the acquired media streams into the plurality of media units, comprises:
   splitting the acquired media streams into the plurality of media units according to a preset size; or
   splitting the acquired media streams into the plurality of media units according to a service type; or
   splitting the acquired media streams into the plurality of media units according to a first resource idle rate of the display device; or
   splitting the acquired media streams into the plurality of media units according to a second resource idle rate of the OPS device.

3. The method according to claim 1, wherein said determining the sub-media stream allocated for the OPS device external to the display device from the acquired media streams, comprises:
   determining the sub-media stream allocated for the OPS device from the acquired media streams according to a first resource idle rate of the display device; or
   determining the sub-media stream allocated for the OPS device from the acquired media streams according to a second resource idle rate of the OPS device.

4. The method according to claim 3, wherein said determining the sub-media stream allocated for the OPS device from the acquired media streams according to the first resource idle rate of the display device, comprises:
   in response to determining that the first resource idle rate is greater than a first threshold, determining a first media stream corresponding to the first resource idle rate from the acquired media streams, and determining the sub-media stream according to the acquired media streams and the first media stream; or
   in response to determining that the first resource idle rate is greater than a second resource idle rate, determining a first media stream corresponding to the first resource idle rate from the acquired media streams, and determining the sub-media stream according to the acquired media streams and the first media stream.

5. The method according to claim 3, wherein said determining the sub-media stream allocated for the OPS device from the acquired media streams according to the second resource idle rate of the OPS device, comprises:
   in response to determining that the second resource idle rate is greater than a second threshold, determining a second media stream corresponding to the second resource idle rate from the acquired media streams, and determining the second media stream as the sub-media stream; or,
   in response to determining that the second resource idle rate is greater than or equal to a first resource idle rate, determining a second media stream corresponding to the second resource idle rate from the acquired media streams, and determining the second media stream as the sub-media stream.

6. The method according to claim 1, further comprising:
   performing, by the display device, media processing on a media stream other than the sub-media stream in the acquired media streams, to obtain a display media stream.

7. The method according to claim 6, wherein after performing, by the display device, media processing on the media stream other than the sub-media stream in the acquired media streams, to obtain the display media stream, the method further comprises:

merging a part of the OPS media stream and a part of the display media stream belonging to a same service, to obtain a merged media stream, and displaying the merged media stream through the display device.

8. The method according to claim 1, further comprising:
displaying a configuration interface for the OPS device through the display device; and
in response to an input instruction on the configuration interface from a user, performing a configuration corresponding to the input instruction on a mode of media processing of the OPS device.

9. The method according to claim 8, wherein said displaying the configuration interface for the OPS device through the display device, comprises:
displaying the configuration interface for the OPS device through a webpage built in an application of the display device; or
displaying the configuration interface for the OPS device through a webpage browser of the display device.

10. The method according to claim 8, wherein said performing the configuration corresponding to the input instruction on the mode of media processing of the OPS device, comprises:
performing the configuration corresponding to the input instruction on the mode of media processing of the OPS device through a web server of the OPS device.

11. The method according to claim 1, wherein the media processing comprises at least one of decoding, transcoding, or video enhancement.

12. A streaming media processing device, comprising a processor and a memory, wherein the memory is configured to store programs executable by the processor, and the processor is configured to read the programs in the memory to execute the method according to claim 1.

13. The streaming media processing device according to claim 12, further comprising the display device configured to display the OPS media stream.

14. The streaming media processing device according to claim 12, the display device is further configured to:
perform media processing on a media stream other than the sub-media stream in the acquired media streams, to obtain a display media stream.

15. The streaming media processing device according to claim 14, wherein the display device is further configured to:
merge a part of the OPS media stream and a part of the display media stream belonging to a same service, to obtain a merged media stream, and display the merged media stream.

16. A non-transitory computer storage medium, on which computer programs are stored, wherein, when the computer programs are executed by a processor, operations of the method according to claim 1 are executed.

17. The non-transitory computer storage medium according to claim 16, wherein when the computer programs are executed by the processor, the processor is configured to:
determine the sub-media stream allocated for the OPS device from the acquired media streams according to a first resource idle rate of the display device; or
determine the sub-media stream allocated for the OPS device from the acquired media streams according to a second resource idle rate of the OPS device.

18. The non-transitory computer storage medium according to claim 17, wherein when the computer programs are executed by the processor, the processor is configured to:
in response to determining that the first resource idle rate is greater than a first threshold, determine a first media stream corresponding to the first resource idle rate from the acquired media streams, and determine the sub-media stream according to the acquired media streams and the first media stream; or
in response to determining that the first resource idle rate is greater than a second resource idle rate, determine a first media stream corresponding to the first resource idle rate from the acquired media streams, and determine the sub-media stream according to the acquired media streams and the first media stream.

19. The non-transitory computer storage medium according to claim 17, wherein when the computer programs are executed by the processor, the processor is configured to:
in response to determining that the second resource idle rate is greater than a second threshold, determine a second media stream corresponding to the second resource idle rate from the acquired media streams, and determine the second media stream as the sub-media stream; or,
in response to determining that the second resource idle rate is greater than or equal to a first resource idle rate, determine a second media stream corresponding to the second resource idle rate from the acquired media streams, and determine the second media stream as the sub-media stream.

* * * * *